United States Patent
Miwa (10) Patent No.: US 7,273,649 B2
(45) Date of Patent: Sep. 25, 2007

(54) HONEYCOMB STRUCTURAL BODY AND CANNING STRUCTURAL BODY STORING THE HONEYCOMB STRUCTURAL BODY

(75) Inventor: Shinichi Miwa, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 184 days.

(21) Appl. No.: 10/506,073

(22) PCT Filed: Mar. 7, 2003

(86) PCT No.: PCT/JP03/02737

§ 371 (c)(1),
(2), (4) Date: Aug. 31, 2004

(87) PCT Pub. No.: WO03/076774

PCT Pub. Date: Sep. 18, 2003

(65) Prior Publication Data

US 2005/0095395 A1 May 5, 2005

(30) Foreign Application Priority Data

Mar. 8, 2002 (JP) .............................. 2002-062798

(51) Int. Cl.
*B01D 46/00* (2006.01)
(52) U.S. Cl. .................. 428/116; 422/177; 422/179; 422/180; 428/34.4; 428/73; 428/119; 428/188
(58) Field of Classification Search ................ 428/116, 428/119, 73, 34.4, 188; 422/179, 177, 180
See application file for complete search history.

(56) References Cited

U.S. PATENT DOCUMENTS

| 2,798,871 A | 7/1957 | Bloom et al. |
| 5,207,989 A | 5/1993 | MacNeil |
| 5,385,873 A | 1/1995 | MacNeill |
| 5,494,881 A * | 2/1996 | Machida et al. ............. 502/439 |
| 5,580,532 A | 12/1996 | Robinson et al. |
| 5,866,079 A * | 2/1999 | Machida et al. ............. 422/179 |
| 6,673,414 B2 * | 1/2004 | Ketcham et al. ............. 428/116 |
| 6,716,512 B2 * | 4/2004 | Yamamoto et al. ......... 428/116 |
| 6,815,038 B2 * | 11/2004 | Morimoto et al. .......... 428/116 |
| 7,087,286 B2 * | 8/2006 | Hijikata ...................... 428/116 |
| 2001/0036427 A1 | 11/2001 | Yamada et al. |

FOREIGN PATENT DOCUMENTS

| EP | 0 643 204 A2 | 3/1995 |
| JP | A 07-022160 | 1/1995 |
| JP | A 7-39763 | 2/1995 |
| JP | A 7-80226 | 3/1995 |
| JP | A 8-109823 | 4/1996 |

* cited by examiner

Primary Examiner—Archene Turner
(74) Attorney, Agent, or Firm—Oliff & Berridge, PLC (57) ABSTRACT

A honeycomb structure according to the present invention has partition walls, and a number of through-holes divided from each other by the partition walls and extending in an axial direction. The honeycomb structure contains silicon carbide (SiC) or a composite material having silicon carbide (SiC) as a main crystal phase, and has a cylindrical shape. A circularity of a periphery of the honeycomb structure is in a range of 1.0 to 2.5 mm. The honeycomb structure can be contained in a metal container in stable state and hardly has problems such as breakage or breakdown.

13 Claims, 7 Drawing Sheets

HONEYCOMB STRUCTURAL BODY AND CANNING STRUCTURAL BODY STORING THE HONEYCOMB STRUCTURAL BODY

TECHNICAL FIELD

The present invention relates to a honeycomb structure and a canning structure containing the honeycomb structure.

BACKGROUND ART

While the recently tightened regulation on exhaust gas has been improving in reducing discharged amounts of harmful substances such as hydrocarbons (HC), carbon monoxide (CO), and nitrogen oxides ($NO_x$) from an engine itself; a three-way catalyst, which is the main current at present, has also been improving. Both of them have been effective in reducing a discharged amount of harmful substances.

However, an amount of harmful substances discharged right after an engine has started is highlightened, while discharged substances are reduced extending over the whole running condition of an engine as the improvement according to tightening of exhaust gas regulations. For example, in FTP-75 cycle, which is a regulated running cycle in U.S., 60-80% of total emission discharged in the whole running cycle is discharged in the Bag-1 mode for 140 second right after the engine has started. This is because a catalyst is not sufficiently activated since temperature of exhaust gas is low right after an engine has started (Bag-1A), thereby passing harmful substances through the catalyst.

Therefore, some measures are employed, for example, putting a catalyst as close to an engine as possible in a place where exhaust gas has high temperature to raise temperature of the catalyst right after an engine has started, thinning the cell partition walls to decrease heat capacity of a catalyst itself, and increasing cell density of a carrier to quickly absorb heat of exhaust gas and to increase a contact area of a catalyst with exhaust gas.

As a catalyst, there is generally used a catalyst produced by loading γ-alumina of a fine porous structure having a high surface area on the surface of cell partition walls of a ceramic honeycomb structure, which is one of cell structures, and then noble metals such as platinum, palladium, and rhodium are loaded, as catalyst components, on the alumina. Further, to these noble metals are added ceria, zirconia, and the like, to store and release oxygen contained in exhaust gas. Such noble metals and oxygen-storing substances are present in a dispersed state in the pores in the γ-alumina layer loaded on the surface of porous cell partition walls (rib) of the carrier.

A honeycomb structure is generally used in such a condition that it is housed (canned) in a container made of metal such as stainless steel with being held by the container. In addition, a honeycomb filter obtained by alternately plugging the honeycomb structure at each end face in such a way that it looks checkerboard patterns is suitably used also as a filter for capturing and removing particulate matters contained in dust-containing fluid such as diesel engine exhaust gas (such a filter may hereinbelow be referred to as "DPF."), and the filter is disposed in a predetermined place after being canned similarly to the case of the aforementioned honeycomb structure.

Upon canning, an appropriate compressible elastic member is disposed in a gap between the container and a peripheral surface of the honeycomb structure to impart an adequate compressing surface pressure to the honeycomb structure. An example of related prior art is a method of canning a honeycomb structure in a metal container with holding the honeycomb structure with a mat of an intumescent material containing vermiculite (see U.S. Pat. Nos. 5,207,989 and 5,385,873).

However, in the case of the method disclosed in the above U.S. Pat. Nos. 5,207,989 and 5,385,873, compressing surface pressure is rapidly raised by intumescence. Therefore, the rapidly raised compressing surface pressure tends to exceed strength (isostatic strength) of a honeycomb structure having thin walls with low strength, and the honeycomb structure is liable to break. In addition, since compressibility of an intumescent mat is quickly deteriorated from about 800 degree C., compressing surface pressure disappears at about 1000 degree C., and it becomes impossible to hold the honeycomb structure.

Whereas, in a non-intumescent mat not containing vermiculite (see U.S. Pat. Nos. 5,580,532 and 2,798,871), the change in surface pressure according to temperature-rise is very small, and the honeycomb structure can be held with surface pressure being hardly decreased even at 1000 degree C.

A honeycomb structure having thin walls has conventionally been held using a non-intumescent mat in place of an intumescent mat. However, when a honeycomb structure is wound with a mat serving as a holding member followed by being canned in a metal container, slippage tends to be caused at the joint of the mat, and surface pressure tends to be increased. Further, when a honeycomb structure having a mat wound thereon is stuffed in a metal container, the mat tends to have rumples, and surface pressure tends to be increased at that point. These cause non-uniform distribution of compressing surface pressure acting on a peripheral surface of the honeycomb structure. When partially heightened compressing surface pressure exceeds isostatic strength of the honeycomb structure, the cell structure breaks. In addition, because of the non-uniform distribution of the surface pressure, the cell structure tends to slip due to vibrations of an engine or pressure of exhaust gas in practical use.

Incidentally, "isostatic strength" of a honeycomb structure means a value measured by "isostatic fracture strength test" provided for by the automobile standards JASO standard M505-87 published by Society of Automotive Engineers of Japan, Inc. Specifically, the test is conducted in such a manner that a cell structure as a carrier is put in a rubber tube, and the container is capped and subjected to isotropic pressure compression, which imitates compression load in the case that a carrier is held at a peripheral surface thereof by a can of a converter. The isostatic strength is shown by a value of pressure at the time of breakage of a carrier. A catalyst converter for purifying automotive exhaust gas generally employs a canning structure in which a carrier is held at a peripheral surface thereof. It is a matter of course that high isostatic strength is preferable in view of canning.

When the actual surface pressure becomes higher than the intended surface pressure planned upon design of canning, the structure may break at the point if the surface pressure exceeds isostatic strength of the honeycomb structure. According as thickness of cell partition walls decreases and strength of the structure is lowered, it is necessary to decrease the intended surface pressure, and it is necessary to minimize fluctuation of the surface pressure by suppressing extraordinary increase of actual canning surface pressure. It is ideal that the actual surface pressure is equal to the intended surface pressure because it makes possible the canning design just as aimed.

Further, a honeycomb structure may break because of varied gap between the honeycomb structure and the metal container due to precision of an external shape of the honeycomb structure or because of uneven compression pressure act on the peripheral portion of the honeycomb structure and high holding surface pressure acts partially as a result of slippage of a holding member caused when the honeycomb structure is housed in a metal container. As the partition walls of a honeycomb structure are made thinner, the isostatic strength level of the honeycomb structure becomes lower, which requires to make compressing surface pressure of the honeycomb structure as low as possible with keeping the minimum surface pressure required for holding a honeycomb structure. As the level of compressing surface pressure is lowered, it is necessary to make variance in surface pressure smaller, i.e., to give more uniform distribution of surface pressure.

The present invention has been made in view of the problems of the prior art and aims to provide a honeycomb structure which is capable of being housed in a metal container under a safely held condition and which hardly has problems such as breakage or breakdown, as well as a canning structure which has a metal container housing the honeycomb structure and which is superior in vibration resistance particularly under high temperature conditions.

DISCLOSURE OF THE INVENTION

According to the present invention, there is provided a honeycomb structure comprising: partition walls; and a number of through-holes divided from each other by the partition walls and extending in an axial direction; the honeycomb structure containing silicon carbide (SiC) or a composite material having silicon carbide (SiC) as a main crystal phase; and having a cylindrical shape, wherein a circularity of a periphery of the honeycomb structure is in a range of 1.0 to 2.5 mm.

According to the present invention, there is also provided a honeycomb structure comprising: partition walls; and a number of through-holes divided from each other by the partition walls and extending in an axial direction; the honeycomb structure containing silicon carbide (SiC) or a composite material containing silicon carbide (SiC) as a main crystal phase; and having a cylindrical shape, wherein a cylindricality of a periphery of the honeycomb structure is in a range of 1.0 to 3.0 mm.

In the present invention, it is preferable that a second phase of the composite material having silicon carbide (SiC) as a main crystal phase is at least one selected from the group consisting of metallic silicon (Si), metal oxide, metal nitride, metal boride and metal carbide and that the metal oxide is at least one selected from the group consisting of $SiO_2$, $Al_2O_3$ and MgO.

The honeycomb structure is preferably used for purification of exhaust gas of automobile, and more preferably used as a filter for capturing diesel particulate matter. According to the present invention, there is further provided a canning structure comprising: the honeycomb structure described above, and a metal container housing the honeycomb structure; wherein the honeycomb structure is housed in the container in a held state by disposing, in a compressed state, a compressible elastic member having thermal resistance and cushioning ability between a peripheral portion of the honeycomb structure and the container.

In the present invention, it is preferable that the metal has a coefficient of thermal expansion of $8 \times 10^{-7}$ to $13 \times 10^{-7}$ and that the metal is a ferrite-based stainless steel and/or a low thermally-expansible special alloy.

In the present invention, it is preferable that the compressible elastic member is a ceramic fiber mat and that the ceramic fiber mat is a non-intumescent mat.

Further, in the present invention, it is preferable that a honeycomb structure is housed in the container by any of stuffing, tourniquet, clamshell, swaging, and rotational forging.

BRIEF DESCRIPTION OF THE DRAWINGS

FIG. 7 depicts examples of measuring the cylindricality (FIG. 7a) and circularity (FIG. 7b) of a structure.

BEST MODE FOR CARRYING OUT THE INVENTION

Embodiments of the present invention will hereinbelow be described. However, the present invention is by no means limited to the embodiments, and it should be understood that modification in design, improvement, etc., may be adequately performed on the basis of those skilled in the art in a range not deviating from the gist of the present invention.

The first aspect of the present invention is a honeycomb structure comprising: partition walls; and a number of through-holes divided from each other by the partition walls and extending in an axial direction; the honeycomb structure containing silicon carbide (SiC) or a composite material containing silicon carbide (SiC) as a main crystal phase; and having a cylindrical shape, wherein a circularity of a periphery of the honeycomb structure is in a range of 1.0 to 2.5 mm. The details will hereinbelow be described.

As mentioned above, to use a honeycomb structure for purification of automotive exhaust gas, it is general to prepare a canning structure by housing (canning) the honeycomb structure in a container made of metal such as stainless steel with being held by the container. A honeycomb structure of the present invention has a circularity of a periphery of 1.0 to 2.5 mm. That is, the shape of a section perpendicular to the direction of through-holes is not exactly circle and the structure, which is cylindrical, has a little distortion. Therefore, when a honeycomb structure is used in a canning structure, compressing surface pressure is applied to hold not the whole peripheral surface of the honeycomb structure, but a partial peripheral surface. A honeycomb structure of the present invention contains silicon carbide (SiC) or a composite material having silicon carbide (SiC) as a main crystal phase. Its coefficient of thermal expansion is higher in comparison with, for example, cordierite (silicon carbide: $4\times10^{-7}$, cordierite: $0.5\times10^{-7}$ to $1.2\times10^{-7}$) and closer to a coefficient of thermal expansion of a metal constituting a container (stainless steel: $8\times10^{-7}$ to $13\times10^{-7}$).

Therefore, it is possible to set lower compressing surface pressure upon canning a honeycomb structure of the present invention in comparison with the case of a honeycomb structure of cordierite. Accordingly, since a canning structure of the present invention has a structure of applying the compressing surface pressure to hold not the whole peripheral surface but a part of the surface, it is very effective in inhibiting a honeycomb structure from slipping between the structure and a container or from falling off from the container due to a temperature difference in a place where the canning structure is placed or in suppressing breakage of the honeycomb structure due to high compressing surface pressure as well as it has high vibration resistance under a condition of high temperature.

Further, to obtain higher effects in inhibiting slippage, falling off, breakage, and the like, it is preferable that the peripheral portion has circularity of 1.5 to 2.5 mm, more preferably 1.5 to 2.0 mm. Incidentally, "circularity" mentioned in the present invention means a value indicated by a difference in diameter in a measured section of a cylindrical honeycomb structure to show an extent of roundness. The measurement is performed by automatic measurement using a laser measuring device, digital calipers, or the like.

The second aspect of the present invention is a cylindrical honeycomb structure having partition walls and a number of through-holes divided from each other by the partition walls and extending in an axial direction, containing silicon carbide (SiC) or a composite material having silicon carbide (SiC) as a main crystal phase, wherein a cylindricality of a periphery of the honeycomb structure is in a range of 1.0 to 3.0 mm.

In a honeycomb structure of the present invention, a cylindricality of the periphery is specified in the rage of 1.0 to 3.0 mm. That is, a section in parallel with the direction of through-holes is not exactly rectangular and the honeycomb structure, which is cylindrical, has a little distortion. Therefore, like the first aspect of the present invention, i.e., a honeycomb structure whose periphery has a circularity of a predetermined range, compressing surface pressure upon canning is applied to hold not the whole peripheral surface of the honeycomb structure but a partial peripheral surface in the case that the honeycomb structure is used in a canning structure.

Since a honeycomb structure of the present invention contains silicon carbide (SiC) or a composite material having silicon carbide (SiC) as a main crystal phase, it is possible to set lower compressing surface pressure upon canning a honeycomb structure of the present invention in comparison with the case of a honeycomb structure of cordierite. Accordingly, since a canning structure of the present invention has a structure of applying the compressing surface pressure to hold not the whole peripheral surface but a part of the surface, it is very effective in inhibiting a honeycomb structure from slipping between the structure and a container or from falling off from the container due to a temperature difference in a place where the canning structure is placed or in suppressing breakage of the honeycomb structure due to high compressing surface pressure as well as it has high vibration resistance under a condition of high temperature.

Further, to obtain higher effects in inhibiting slippage, falling off, breakage, and the like, it is preferable that the peripheral portion has cylindricality of 1.5 to 2.5 mm. Incidentally, "cylindricality" mentioned in the present invention means a value indicated by a difference in diameters of two coaxial geometrical cylinders (standard cylinders) in the case of forming the minimum gap formed when a honeycomb structure is sandwiched by the coaxial geometrical cylinders (standard cylinders) to show if its a geometric cylinder or not. The measurement is performed by automatic measurement using a laser measuring device, digital calipers, or the like, similarly to the case of measurement for circularity.

For the second phase of the composite material having silicon carbide (SiC) as a main crystal phase, there is preferably used at least one selected from the group consisting of metallic silicon (Si), metal oxide, metal nitride, metal boride and metal carbide from the viewpoint of low thermal expansion, heat resistance, oxidation resistance, and the like. Specifically, as the above metal oxide, at least one selected from the group consisting of $SiO_2$, $Al_2O_3$ and MgO is preferably employed in view of practicability. Incidentally, in the present invention, a minute phase inevitably coexist in view of production may be contained besides the above main crystal phase and the second phase.

As described above, a honeycomb structure of the present invention is preferably used as a filter for purifying automotive exhaust gas or further for capturing diesel particulate matter by taking advantage of features such as high vibration resistance under a condition of high temperature.

A honeycomb structure of the present invention will hereinbelow described in more detail with an example of a method for production thereof. In the first place, silicon carbide (SiC) is prepared to produce a honeycomb structure. Silicon carbide (SiC) sometimes contains minute impurities such as Fe, Al, and Ca. Such silicon carbide may be used as it is or subjected to a chemical treatment such as chemical washing to purify. To the silicon carbide (SiC) may be added, as a material for forming the second phase, at least one of metallic silicon (Si), metal oxides such as $SiO_2$, $Al_2O_3$, and MgO, non-oxides such as metal nitride, metal boride, and metal carbide, and the like.

For smooth extrusion of clay into a honeycomb shape, it is preferable that at least one suitable organic binder is added in an appropriate amount. Further, water and the like are added to the material, followed by mixing and kneading to obtain clay for forming.

When partition walls (cell partition walls) constituting cells of the honeycomb structure are used as a filter, a pore former is added to the material for preparing clay to raise the porosity. In this case, since pores are formed at the space where the pore former disappears after the burning, it is preferable to use a pore former having the average particle diameter within the range from 100 to 150% with respect to the intended average pore diameter after being fired.

The clay obtained by mixing and kneading the above material by an ordinary method is formed into a honeycomb structure having a desired cell shape by extrusion or the like. As to a cell shape, it is general that a honeycomb structure used as a DPF has a square cell shape. However, in a honeycomb structure of the present invention, a cell shape is not restricted to a square and may be a rectangle, a triangle, a hexagon, a circle, or the like.

When a honeycomb structure is used as a catalyst carrier for purification of automotive exhaust gas or as a DPF, the cell partition walls may have a thickness of 0.11 to 0.17 mm, and a cell density may be 300 to 1200 cpsi, or the cell partition walls may have a lower thickness of 0.02 to 0.10 mm. A honeycomb structure used for a heat-exchanger may have a structure having a high cell density of 1200 cpsi or more. Incidentally, a cell structure is specified by a cell wall thickness and a cell density, and a cell density is generally shown by cpsi. For example, a cell density of 400 cpsi means presence of 400 cells per square inch, and "cpsi" is an abbreviation of "cells per square inch". Cell partition wall thickness is also called as rib thickness, and it has conventionally shown with a unit "mil". One mil is $1 \times 10^{-3}$ inch, and it is about 0.025 mm.

The formed body obtained above is calcined to remove an organic binder contained in the formed body, and then subjected to firing. It is preferable that the calcination is performed at a temperature lower than a temperature at which metallic silicon melts. Specifically, it may temporarily be kept at a predetermined temperature of about 150 to 700 degree C. Alternatively, calcination may be conducted at a heating rate of 50 degree C./hr or less within the predetermined temperature range.

In the manner of temporarily keeping the formed body at a predetermined temperature, the formed body may be kept at one temperature level or at plural temperature levels. When the formed body is kept at plural temperature levels, the time for keeping the temperature may be the same or different from each other. Similarly, as to a manner of making slower a heating rate, the heating rate may be made slower in a certain temperature range or in plural temperature ranges. When the heating rate is made slower in plural ranges, the rate may be the same or different from each other.

The calcination may be performed in an oxidization atmosphere. However, in the case that a large amount of organic binder(s) is contained in the formed body, the organic binder(s) sometimes burn(s) furiously with oxygen to raise temperature of the formed body rapidly during the calcination. Therefore, in such a case, it is also preferable to perform the calcination in an inert atmosphere such as $N_2$ and Ar to suppress extraordinary temperature rise of the formed body.

The calcination and the following main firing may be performed in the same furnace or different furnaces as different steps. Alternatively, they may be performed in the same furnace as successive steps. The former manner is also preferable when the calcination and the main firing are performed in different atmospheres. However, the latter manner is also preferable from the viewpoint of total firing time, running cost of a furnace, and the like.

The optimum firing temperature during the main firing is determined depending on a micro-structure and properties, and the temperature of 1400 to 1800 degree C. is appropriate in general. As to an atmosphere of the main firing, a non-oxidizing atmosphere such as $N_2$ and Ar is preferable to avoid oxidation of silicon carbide at high temperature.

When the honeycomb structure of the present invention is used as a carrier for catalyst in an internal combustion engine, a boiler, a chemical reactor, a fuel cell reformer, or the like, the honeycomb segments used therein are allowed to load thereon a metal having a catalytic activity. As representative metals having a catalytic activity, there are mentioned Pt, Pd, Rh, K, Na, Li, etc. It is preferred that at least one selected from these metals is loaded on the honeycomb segments.

On the other hand, when the honeycomb structure of the present invention is used as a filter for capturing particulate matter in exhaust gas such as DPF, cell walls are made to a filter by plugging cells alternately at each end face so that the end faces show checkerboard pattern. When exhaust gas containing particulate matter is taken into a honeycomb structure constituted by such honeycomb segments, from its one end face, the exhaust gas enters the inside of the honeycomb structure from those openings not plugged at the one end face, passes through porous cell walls having a filtration ability, and is discharged from the openings not plugged at the other end. When the exhaust gas passes through the cell walls, the particulate matter present in the exhaust gas is captured by the partition walls.

As the captured particulate matter builds up on cell walls, pressure loss increases rapidly, an engine load increases, fuel consumption and drivability deteriorate; hence, the particulate matter is burnt and removed periodically by a heating means such as a heater, to regenerate ability of the filter. In order to promote the combustion during the regeneration, metal having a catalytic activity such as mentioned above may be loaded on the honeycomb structure.

Next, description is made on the third aspect of the present invention. The third aspect of the present invention is a canning structure comprising: any of the honeycomb structure mentioned above, and a metal container housing the honeycomb structure; wherein the honeycomb structure is housed in the container in a held state by disposing, in a compressed state, a compressible elastic member having thermal resistance and cushioning ability between a peripheral portion of the honeycomb structure and the container. The details will hereinbelow be described.

As described above, since a peripheral portion of a honeycomb structure of the present invention has a predetermined circularity or cylindricality, a canning structure of the present invention obtained by using the honeycomb structure of the present invention hold not the whole peripheral surface of the honeycomb structure but a part of the peripheral surface by compressing surface pressure applied when the honeycomb structure is canned with a compressible heat-insulating material being disposed between a peripheral portion of the honeycomb structure and a metal container. Since the honeycomb structure to be housed in the container is constituted by silicon carbide (SiC), the structure has a coefficient of thermal expansion higher than that of cordierite (silicon carbide: $4 \times 10^{-7}$, cordierite: $0.5 \times 10^{-7}$ to $1.2 \times 10^{-7}$) and the coefficient of thermal expansion is close to that of the metal constituting the container (stainless steel: about $10 \times 10^{-7}$).

Therefore, as to a canning structure of the present invention, it is possible to set lower compressing surface pressure upon canning a honeycomb structure of the present invention in comparison with the case of a honeycomb structure of cordierite. Accordingly, since a canning structure of the present invention has a structure of applying the compressing surface pressure to hold not the whole peripheral surface but a part of the surface, it is very effective in inhibiting a honeycomb structure from slipping between the structure and a container or from falling off from the container due to a temperature difference in a place where the canning structure is placed or in suppressing breakage of the honeycomb structure due to high compressing surface pressure as well as it has high vibration resistance under a condition of high temperature.

Further, it is preferable that the metal constituting the container for housing the honeycomb structure has a coefficient of thermal expansion of $8 \times 10^{-7}$ to $13 \times 10^{-7}$, more preferably $8 \times 10^{-7}$ to $1 \times 10^{-7}$. A canning structure with a container of a metal having a coefficient of thermal expansion within the above range shows superior characteristics such as vibration resistance under a condition of high temperature from the relation among a coefficient of thermal expansion of $4 \times 10^{-7}$ of silicon carbide (SiC) constituting the honeycomb structure, circularity, and cylindricality.

In addition, it is preferable that the metal constituting the container for housing the honeycomb structure is a ferrite-based stainless steel and/or a low thermally-expansible special alloy. Each of these metals has a coefficient of thermal expansion suitable for constituting a container of a canning structure showing superior characteristics such as vibration resistance under a condition of high temperature from the relation among a coefficient of thermal expansion of silicon carbide (SiC) constituting a honeycomb structure, circularity and cylindricality of a peripheral portion of the honeycomb structure.

In the present invention, it is preferable that the compressible elastic member is a ceramic fiber mat. This is because a ceramic fiber mat has sufficient heat resistance and cushioning ability as well as it can easily be obtained and processed. A preferable ceramic fiber mat is a non-intumescent mat substantially not containing vermiculite, a low-intumescent mat containing a small amount of vermiculite, or the like, and contains as the main component, ceramic fibers comprising alumina, high-alumina, mullite, silicon carbide, silicon nitride, zirconia, titania, or a mixture thereof. Among these, further preferable is a non-intumescent mat substantially not containing vermiculite and containing, as the main component, alumina or mullite.

Next, a canning structure of the present invention is hereinbelow described in more detail with an example of a method for production thereof. A canning structure can be obtained by housing, in a metal container, a honeycomb structure of the present invention obtained in the aforementioned method of production. In the present invention, the preferable methods to impart compressing surface pressure to the honeycomb structure by means of housing of the honeycomb structure in the container and a compressible elastic member is as follows.

Figure 1:
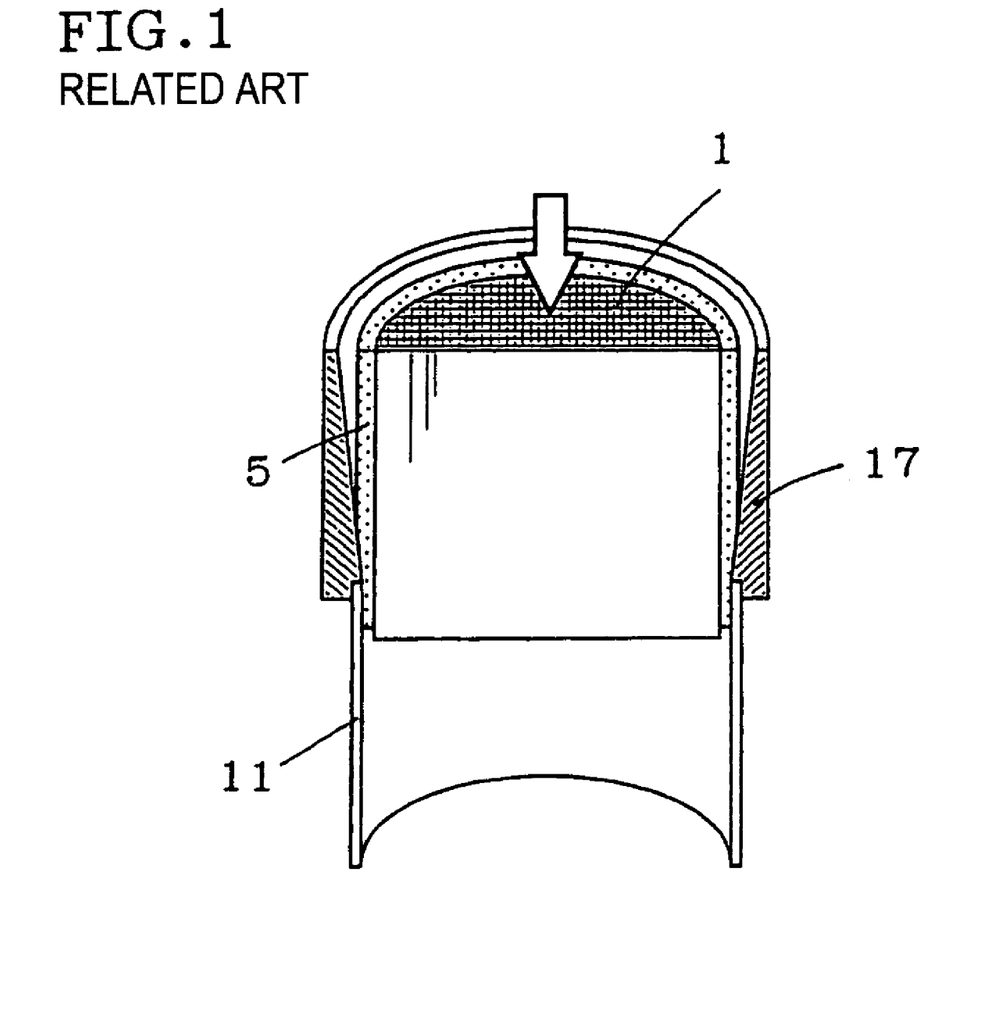
FIG. 1 is a partially cut-away view showing one example of the stuffing method used for housing a honeycomb structure in a metallic container.
Figure 2:
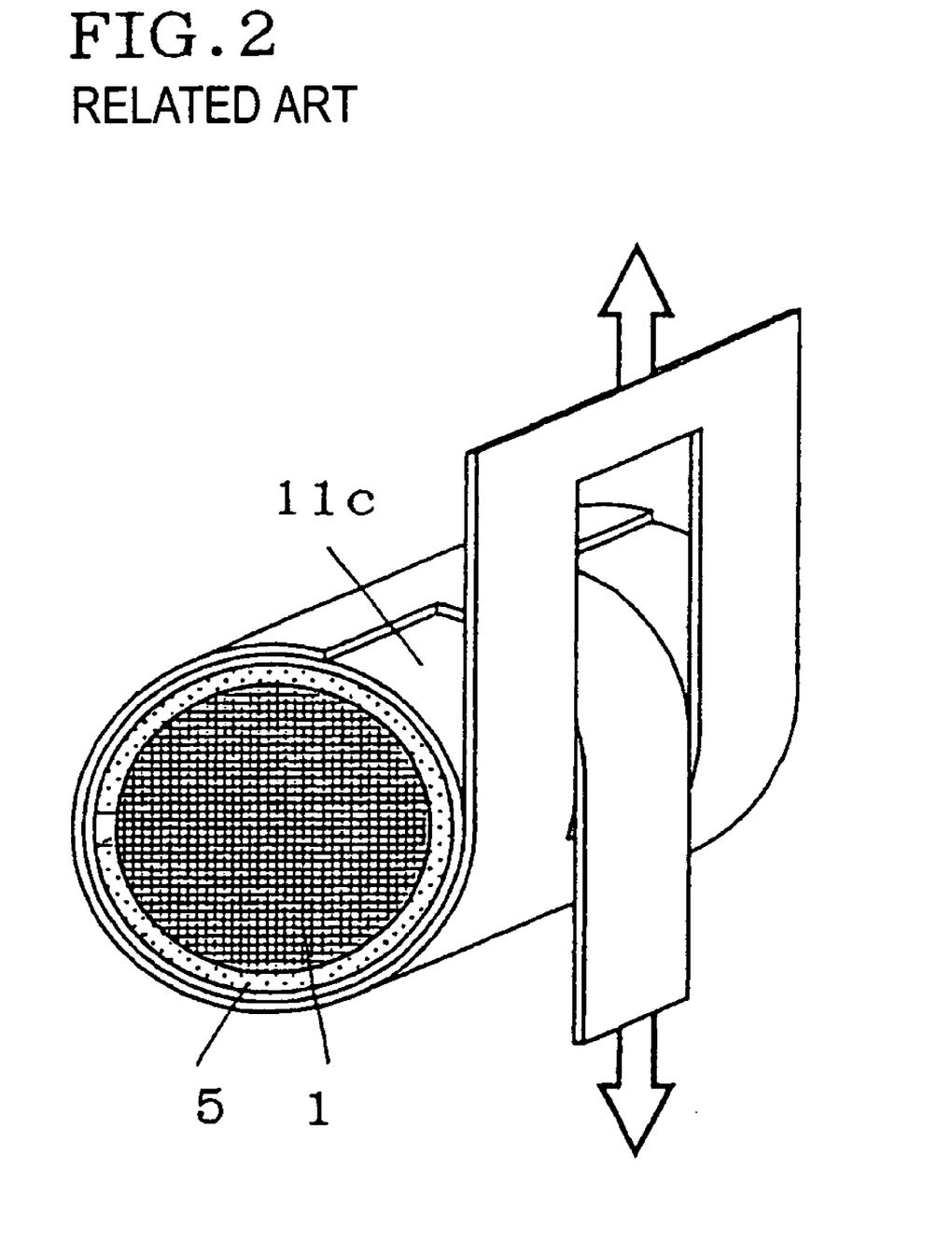
FIG. 2 is a perspective view showing one example of the tourniquet method used for housing a honeycomb structure in a metallic container.
Figure 3:
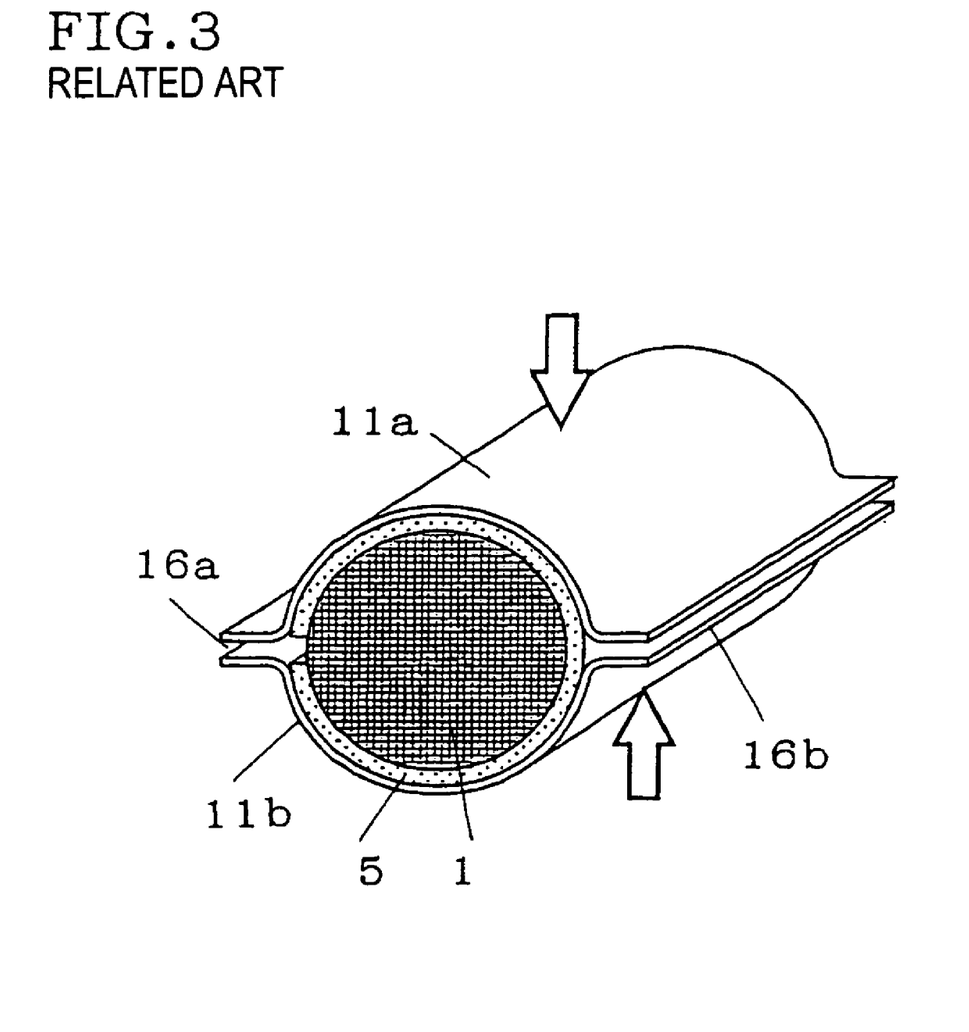
FIG. 3 is a perspective view showing one example of the clamshell method used for housing a honeycomb structure in a metallic container.
Figure 4:
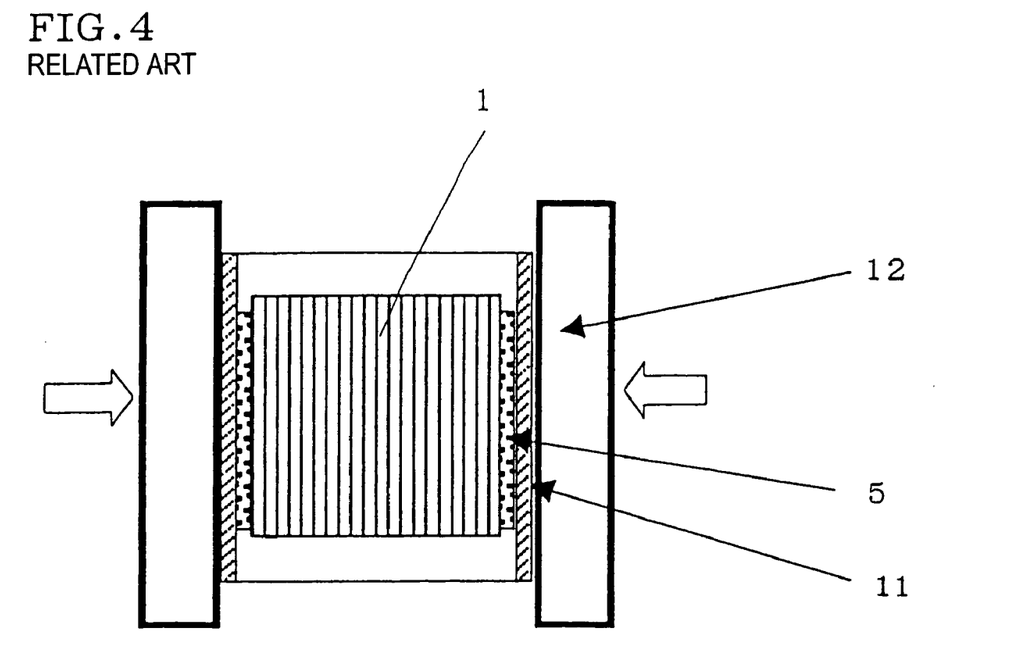
FIG. 4 is a sectional view parallel to the direction of through-holes, showing one example of the swaging method used for housing a honeycomb structure in a metallic container.
Figure 5:
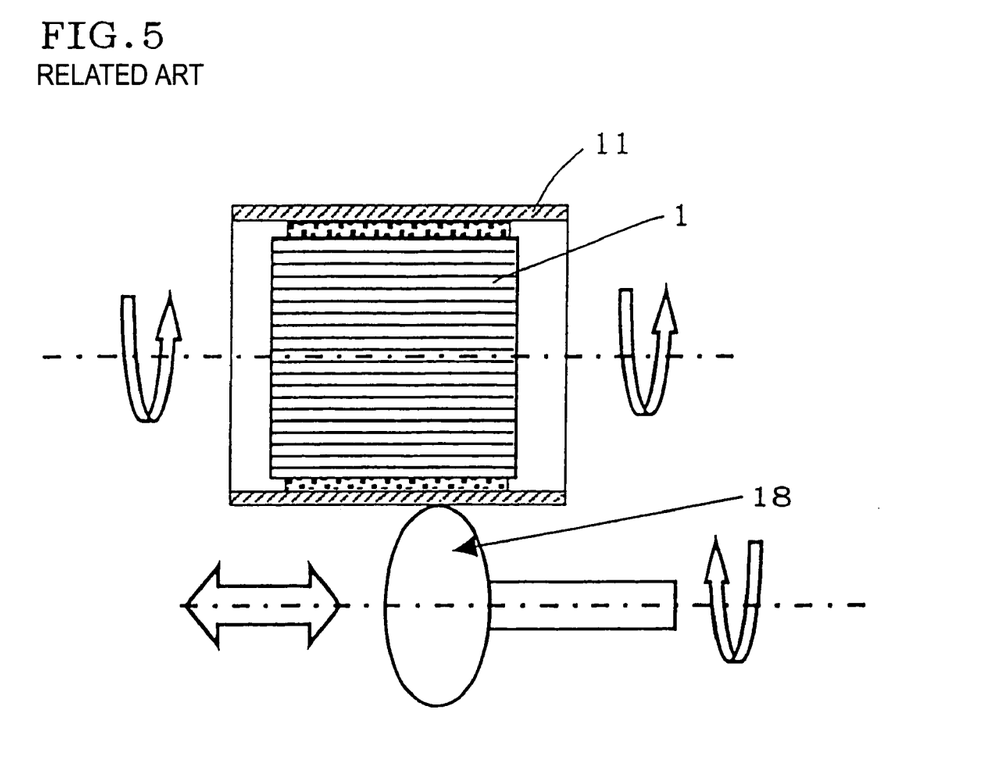
FIG. 5 is a sectional view parallel to the direction of through-holes, showing one example of the swaging method used for housing a honeycomb structure in a metallic container.

That is, there are suitably used a stuffing method shown in FIG. 1, using a guide 17; a tourniquet method shown in FIG. 2, which comprises winding a metallic plate 11c around a honeycomb structure, pulling the plate to impart a pressure to the outer surface of the honeycomb structure, and welding and fixing the to-be-jointed areas of the metallic plate 11c; and a clamshell method shown in FIG. 3, which comprises interposing a honeycomb structure between two metallic container parts 11a and 11b with applying a load to the parts 11a and 11b, and welding the to-be-bonded areas (flanges) 16a and 16b of the parts 11a and 11b to obtain a bonded container. There is also suitably used a swaging method utilizing metal forming technology, shown in FIG. 4, which comprises applying a compression force to a metallic container 11 from the outside via a tap (of pressure type) to reduce the outer diameter of the metallic container 11. Further, there can also be suitably used a swaging method as shown in FIG. 5, which comprises spinning the outer surface of a metallic container 11 by metal forming process using a processing jig 18 with the metallic container 11 being rotated, to reduce the outer diameter of a metallic container, and thereby imparting a pressure to the outer surface of a honeycomb structure in the metallic container. Incidentally, in FIG. 1, the reference numeral 1 denotes a honeycomb structure, the reference numeral 5 denotes a compressible elastic body B, and the reference numeral 11 denotes a metal container. Even in the other drawings, the same reference numerals denote the same portions.

The concrete results of the present invention performed are hereinbelow described.

EXAMPLES 1 to 33, COMPARATIVE EXAMPLES 1 to 14

Figure 7A:
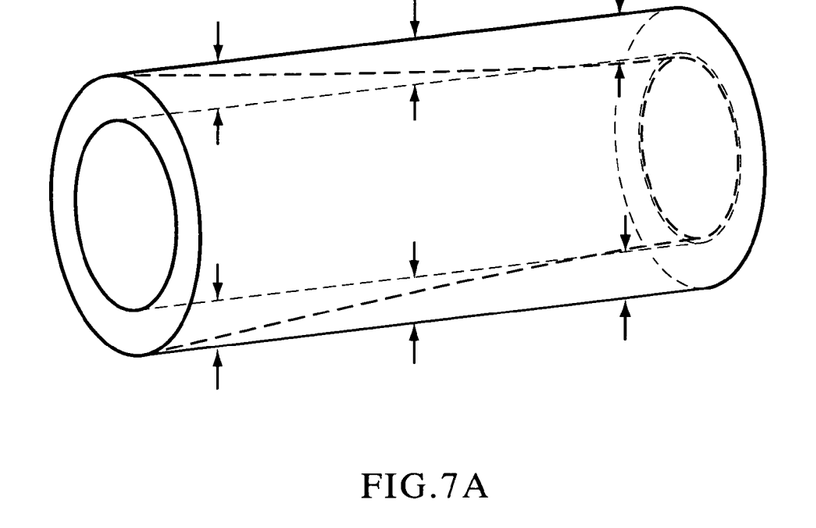
Figure 7B:
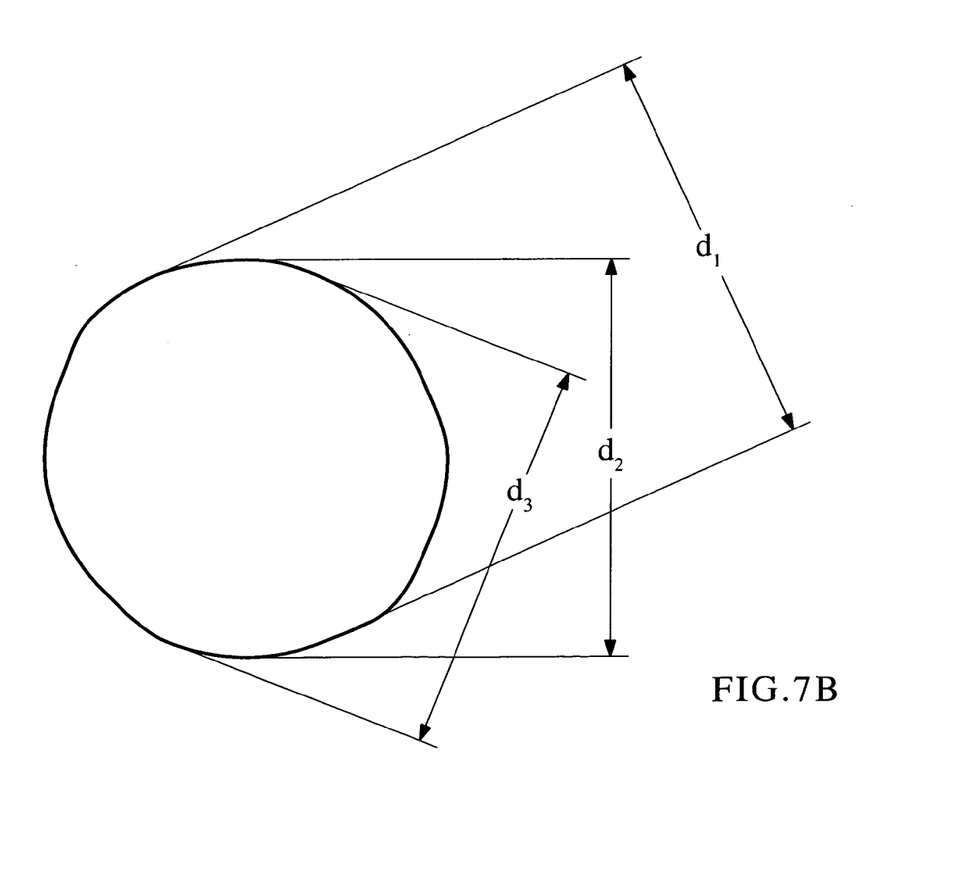

A silicon carbide powder was used as a raw material. Thereto were added methyl cellulose, hydroxypropoxyl methyl cellulose, a surfactant and water to prepare clay having plasticity. The clay was subjected to extrusion to give a honeycomb shape, followed by drying, and then both end faces were alternately plugged with a plugging material of the same material as the honeycomb structure so that the end faces show checkerboard pattern. After heat-degreasing the honeycomb shaped clay in a $N_2$ atmosphere, it was fired in an Ar atmosphere to obtain a cylindrical honeycomb structure having a diameter of 5.66 inches, a length of 6 inches, and a thickness of 15 mil/cell density of 300 cpi. Incidentally, each of the honeycomb structures obtained was measured for porosity and average pore diameter using a mercury porosimeter, and for circularity and cylindricality by the method described above. Cylindricality was determined in accordance with JIS (Japanese Industrial Standard) Definitions and Designations of Geometrical Deviations. Cylindricality is represented by the difference between the radii of the two cylinders in the case where the distance between the two coaxial cylinders becomes minimum when the considered cylindrical feature is held between two coaxial geometrical cylinders. An example of measuring the cylindricality is depicted in FIG. 7A. In the tested examples. 9,000 points of the upper, middle, and lower portions (3,000 each) at the circumference of the structure were measured to identify the shape of the object to be measured. The cylindricality was calculated out by using thus measured total 9,000 points (3,000 points each) as a difference between concentric circumscribing cylinder and inscribed cylinder. The circularity of the tested examples was determined by a simplified method using calipers. An example of determining circularity is given in FIG. 7B. The circularity of the tested examples was determined as the difference of a maximum diameter and a minimum diameter, as illustrated in FIG. 7B, D1, D2 . . . DN. Circularity of the tested examples was determined by using data obtained at total 9,000 points (3,000 points each) at upper, middle and lower cross-section of the object to be determined. The results are shown in Tables 1 and 2.

A ceramic non-expansible mat having a thickness of 6.8 mm is wound around the peripheral portion of each of the honeycomb structures obtained above, and each of the honeycomb structures was pressed in a SUS409 can for canning to obtain a canning structure. Incidentally, the ceramic non-intumescent mat had a thickness of 4 mm after being pressed in the can.

(Evaluation of Durability)

Figure 6:
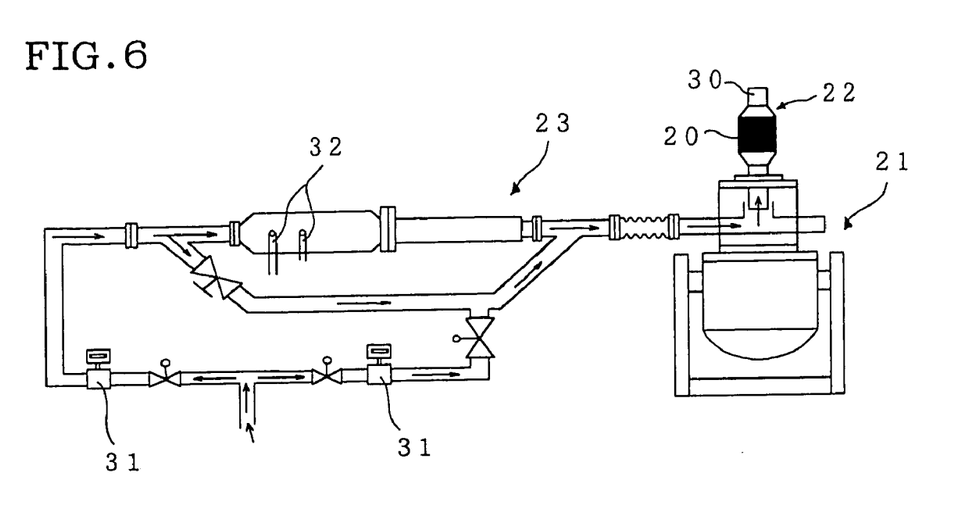
FIG. 6 is a schematic view showing a high-temperature gas generator and a vibration generator connected with the high-temperature gas generator.

A canning structure was evaluated for durability using a high-temperature gas generator 23 shown in FIG. 6 and a vibration generator 21 connected with the high-temperature gas generator 23. After the canning structure 20 was set at the vibrating portion 22 of the vibration generator 21, a high-temperature gas generated from the high-temperature gas generator 23 was sent in the honeycomb structure from the lower end face (exhaust gas flow-in end face) and discharged from the upper end face (exhaust gas flow-out end face), with operating the vibration generator 21 to generate vertical vibrations. Incidentally, the durability test time was 100 hours, the temperature of the high-temperature gas was 700 degree C., and the vibrations applied was 100 Hz at 60 G. After the durability test time passed, the canning structure was taken out, and conditions of the honeycomb structure were evaluated. The results are shown in Tables 1 and 2. Incidentally, the evaluations of the durability were given with "bad" in the case that both slipping and breakage of the honeycomb structure were caused, "fair" in the case that breakage of the honeycomb structure was caused, "good" in the case of a honeycomb structure with a little slipping (1 mm or less), and "excellent" in the case of the honeycomb structure having no problem. Incidentally, in FIG. 6, the reference numeral 30 denotes an exhaust port, the reference numeral 31 denotes a flowmeter, and the reference numeral 32 denotes a burner.

TABLE 1

| | Porosity (%) | Average pore diameter (μm) | Circularity (mm) | Durability |
|---|---|---|---|---|
| Example 1 | 38 | 10 | 2 | Excellent |
| Example 2 | 44 | 14 | 2 | Excellent |
| Example 3 | 47 | 20 | 2 | Excellent |
| Example 4 | 38 | 11 | 1.5 | Excellent |
| Example 5 | 44 | 15 | 1.5 | Excellent |
| Example 6 | 47 | 20 | 1.5 | Excellent |
| Example 7 | 38 | 11 | 2.5 | Good |
| Example 8 | 44 | 14 | 2.5 | Excellent |
| Example 9 | 47 | 20 | 2.5 | Excellent |
| Example 10 | 38 | 9 | 1 | Good |
| Example 11 | 47 | 20 | 1 | Excellent |
| Example 12 | 44 | 16 | 1 | Excellent |
| Example 13 | 58 | 25 | 2.5 | Good |
| Example 14 | 58 | 26 | 2 | Excellent |
| Example 15 | 58 | 25 | 1.5 | Excellent |
| Example 16 | 58 | 24 | 1 | Excellent |
| Comp. Ex. 1 | 38 | 10 | 0.5 | Bad |
| Comp. Ex. 2 | 44 | 16 | 0.5 | Bad |
| Comp. Ex. 3 | 47 | 21 | 0.5 | Fair |
| Comp. Ex. 4 | 38 | 10 | 3 | Fair |
| Comp. Ex. 5 | 44 | 16 | 3 | Bad |
| Comp. Ex. 6 | 47 | 19 | 3 | Bad |

TABLE 2

| | Porosity (%) | Average pore diameter (μm) | Cylindricality (mm) | Durability |
|---|---|---|---|---|
| Example 17 | 38 | 10 | 2 | Excellent |
| Example 18 | 44 | 16 | 2 | Excellent |
| Example 19 | 47 | 19 | 2 | Excellent |
| Example 20 | 38 | 11 | 1.5 | Excellent |
| Example 21 | 44 | 16 | 1.5 | Excellent |
| Example 22 | 47 | 21 | 1.5 | Excellent |
| Example 23 | 38 | 11 | 2.5 | Excellent |
| Example 24 | 44 | 15 | 2.5 | Excellent |
| Example 25 | 47 | 20 | 2.5 | Excellent |
| Example 26 | 58 | 26 | 2.5 | Excellent |
| Example 27 | 58 | 25 | 1 | Good |
| Example 28 | 58 | 25 | 1.5 | Excellent |
| Example 29 | 58 | 24 | 2 | Excellent |
| Example 30 | 58 | 24 | 3 | Excellent |
| Example 31 | 38 | 11 | 3 | Good |
| Example 32 | 47 | 19 | 3 | Excellent |
| Example 33 | 44 | 16 | 3 | Excellent |
| Comp. Ex. 7 | 38 | 11 | 0.5 | Bad |
| Comp. Ex. 8 | 44 | 16 | 0.5 | Bad |
| Comp. Ex. 9 | 47 | 20 | 0.5 | Bad |
| Comp. Ex. 10 | 38 | 9 | 3.5 | Fair |
| Comp. Ex. 11 | 44 | 15 | 3.5 | Fair |
| Comp. Ex. 12 | 47 | 21 | 3.5 | Fair |
| Comp. Ex. 13 | 58 | 26 | 0.5 | Fair |
| Comp. Ex. 14 | 58 | 25 | 3.5 | Bad |

As obvious from the results shown in Tables 1 and 2, with regard to canning structures each showing a circularity within the range from 1.0 to 2.5 mm in Examples 1 to 16 and canning structures each showing a cylindricality within the range from 1.0 to 3.0 mm in Examples 17 to 33, no problem such as slipping or breakage of the honeycomb structure was caused, and this made clear that these canning structures shows superior high-temperature vibration resistance to the canning structures each canned with a similar compressing surface pressure in Comparative Examples 1 to 14.

INDUSTRIAL APPLICABILITY

As described above, since a honeycomb structure of the present invention has a predetermined circularity and cylindricality, it can be housed in a metal container under a safely held condition and hardly has problems such as breakage or break down. In addition, since a canning structure of the present invention has a metal container housing the above honeycomb structure, it is superior in vibration resistance particularly under high temperature conditions.

The invention claimed is:

1. A honeycomb structure comprising:
   partition walls; and
   a number of through-holes divided from each other by the partition walls and extending in an axial direction;
   the honeycomb structure containing silicon carbide (SiC) or a composite material having silicon carbide (SiC) as a main crystal phase; and having a cylindrical shape;
   wherein a circularity of a periphery of the honeycomb structure is in a range of 1.0 to 2.5 mm, or a cylindricality of a periphery of the honeycomb structure is in a range of 1.0 to 3.0 mm, so that the honeycomb structure can be held in a container with lower compressing surface pressure.

2. The honeycomb structure according to claim 1, wherein a second phase of the composite material having silicon carbide (SiC) as a main crystal phase is at least one selected from the group consisting of metallic silicon (Si), metal oxide, metal nitride, metal boride and metal carbide.

3. The honeycomb structure according to claim 2, wherein the metal oxide is at least one selected from the group consisting of $SiO_2 Al_2O_3$ and $MgO$.

4. The honeycomb structure according to claim 1, wherein the honeycomb structure is used for purifying automotive exhaust gas.

5. The honeycomb structure according to claim 1, wherein the honeycomb structure is used as a diesel particulate filter.

6. A canning structure comprising:
   a honeycomb structure; and
   a metal container housing the honeycomb structure;
   wherein the honeycomb structure is housed in the container in a held state by disposing, in a compressed state, a compressible elastic member having thermal resistance and cushioning ability between a peripheral portion of the honeycomb structure and the container;
   the honeycomb structure comprising:
   partition walls; and
   a number of through-holes divided from each other by the partition walls and extending in an axial direction;
   the honeycomb structure containing silicon carbide (SiC) or a composite material having silicon carbide (SiC) as a main crystal phase; and having a cylindrical shape;
   a circularity of a periphery of the honeycomb structure being in a range of 1.0 to 2.5 mm, or a cylindricality of a periphery of the honeycomb structure being in a range of 1.0 to 3.0 mm, so that the honeycomb structure is held in the container with lower compressing surface pressure.

7. The canning structure according to claim 6, wherein the metal has a coefficient of thermal expansion of $8 \times 10^{-7}$ to $13 \times 10^{-7}$.

8. The canning structure according to claim 6, wherein the metal is a ferrite-based stainless steel and/or a low thermally-expansible special alloy.

9. The canning structure according to claim 6, wherein the compressible elastic member is a ceramic fiber mat.

10. The canning structure according to claim 9, wherein the ceramic fiber mat is a non-intumescent mat.

11. The canning structure according to claim 6, wherein the canning structure has a structure enabling the honeycomb structure to be housed in the container by at least one of stuffing, tourniquet, clamshell, swaging, and rotational forging.

12. A diesel particulate filter comprising a honeycomb structure according to claim 1.

13. A motor vehicle exhaust gas purifying device comprising a honeycomb structure according to claim 1.

* * * * *